US010890562B2

(12) United States Patent
Yamamoto et al.

(10) Patent No.: US 10,890,562 B2
(45) Date of Patent: Jan. 12, 2021

(54) TANDEM MASS SPECTROMETER

(71) Applicant: SHIMADZU CORPORATION, Kyoto (JP)

(72) Inventors: Hideki Yamamoto, Kyoto (JP); Tohru Shiohama, Kyoto (JP); Hiroaki Kozawa, Kyoto (JP); Atsushige Ikeda, Kyoto (JP); Minoru Fujimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/766,477

(22) PCT Filed: Oct. 7, 2015

(86) PCT No.: PCT/JP2015/078516
§ 371 (c)(1),
(2) Date: Apr. 6, 2018

(87) PCT Pub. No.: WO2017/060991
PCT Pub. Date: Apr. 13, 2017

(65) Prior Publication Data

US 2018/0284065 A1 Oct. 4, 2018

(51) Int. Cl.
*H01J 49/04* (2006.01)
*G01N 27/62* (2006.01)
(Continued)

(52) U.S. Cl.
CPC ............ *G01N 27/62* (2013.01); *H01J 49/005* (2013.01); *H01J 49/0009* (2013.01);
(Continued)

(58) Field of Classification Search
CPC .. G01N 27/62; H01J 49/0009; H01J 49/0027; H01J 49/0045; H01J 49/005; H01J 49/04; H01J 49/062; H01J 49/426
See application file for complete search history.

(56) References Cited

U.S. PATENT DOCUMENTS 6,586,727 B2 * 7/2003 Bateman ............. H01J 49/0045 250/281
6,797,947 B2 * 9/2004 Russ, IV ............. H01J 49/0009 250/281
(Continued)

FOREIGN PATENT DOCUMENTS

CN 104781659 A 7/2015
JP 2005-181236 A 7/2005
(Continued)

OTHER PUBLICATIONS

Communication dated Sep. 25, 2018, from European Patent Office in counterpart application No. 15905811.4.
(Continued)

*Primary Examiner* — Wyatt A Stoffa
(74) *Attorney, Agent, or Firm* — Sughrue Mion, PLLC

(57) ABSTRACT

Under the control of an analysis control unit (5), a mass spectrometer unit (2) performs a product-ion scan measurement for a target component in a target sample within a time range where the component is introduced. It also performs a scan measurement over an m/z range including the m/z of an ion originating from a standard component within the same segment of time. A mass correction information calculator (42) calculates mass correction information from measured and theoretical values of the m/z of the ion originating from the standard component observed on an MS spectrum obtained by the scan measurement. Using the mass correction information, a mass corrector (43) corrects the m/z of each ion peak originating from the target component
(Continued)

observed on an MS/MS spectrum obtained by the product-ion scan measurement performed within the same cycle as the scan measurement concerned. It is possible to consider that the MS measurement and the MS/MS measurement within the same cycle have been almost simultaneously carried out. Accordingly, a mass correction which is almost equivalent to an internal standard method can be achieved.

4 Claims, 4 Drawing Sheets

(51) Int. Cl.
*H01J 49/00* (2006.01)
*H01J 49/06* (2006.01)
*H01J 49/42* (2006.01)

(52) U.S. Cl.
CPC ...... *H01J 49/0027* (2013.01); *H01J 49/0045* (2013.01); *H01J 49/04* (2013.01); *H01J 49/062* (2013.01); *H01J 49/426* (2013.01)

(56) References Cited

U.S. PATENT DOCUMENTS 7,071,463 B2 * 7/2006 Bowdler ............ H01J 49/0009 250/281
8,335,655 B2 * 12/2012 Olson ................ H01J 49/0031 702/19
8,866,074 B2 * 10/2014 Okumura ........... H01J 49/0031 250/287
2003/0155505 A1 * 8/2003 Russ, IV .............. H01J 49/004 250/288
2004/0041091 A1 * 3/2004 Bateman ............ H01J 49/0031 250/282
2009/0299671 A1 * 12/2009 Jones ................. H01J 49/0031 702/85
2011/0284740 A1 * 11/2011 Okumura ........... H01J 49/0009 250/288
2012/0223223 A1 * 9/2012 Sugiyama .......... H01J 49/0031 250/282
2013/0228679 A1 * 9/2013 Makarov ............ H01J 49/0031 250/282
2013/0274143 A1 * 10/2013 Emanuele, II ........ H01J 49/164 506/12
2013/0338679 A1 * 12/2013 Rosielle ................ A61B 34/37 606/130
2014/0117219 A1 * 5/2014 Kenny ............... H01J 49/0031 250/252.1
2014/0183347 A1 * 7/2014 Makarov ................ H01J 49/14 250/252.1
2014/0306106 A1 * 10/2014 Olney ................ H01J 49/0031 250/282
2014/0312220 A1 * 10/2014 Simmons ............. H01J 49/004 250/282
2015/0144778 A1 * 5/2015 Bonner ................... H01J 49/42 250/282
2015/0279644 A1 * 10/2015 Bonner .............. H01J 49/0031 250/282
2015/0279649 A1 * 10/2015 Yamaguchi .......... H01J 49/004 250/287
2017/0047208 A1 * 2/2017 Brown ............... H01J 49/0009

FOREIGN PATENT DOCUMENTS

WO 2013/081581 A1 6/2013
WO WO-2014073094 A1 * 5/2014 .......... H01J 49/0009

OTHER PUBLICATIONS

Communication dated Jan. 14, 2020, from the State Intellectual Property Office of the P.R. of China in Application No. 201580083655.2.

* cited by examiner

Fig. 2
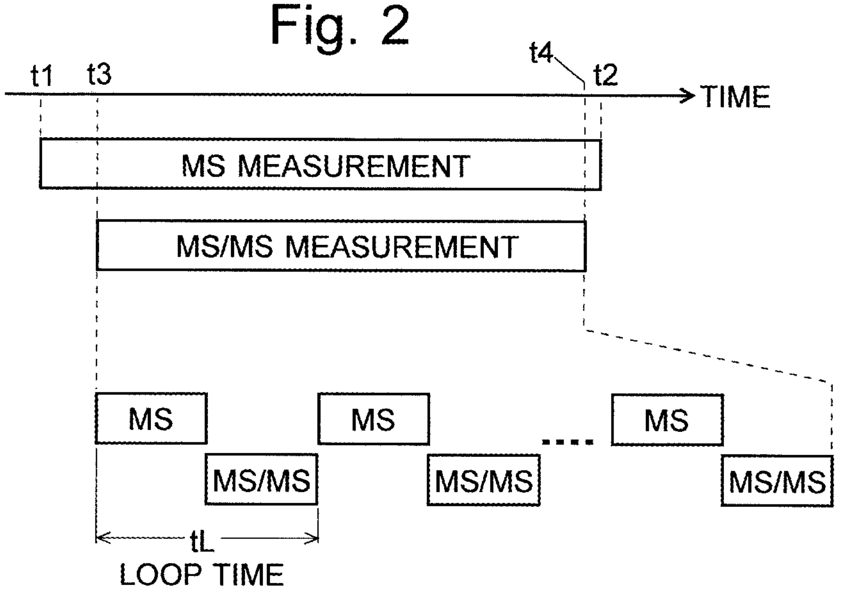
Fig. 3A
Fig. 3B
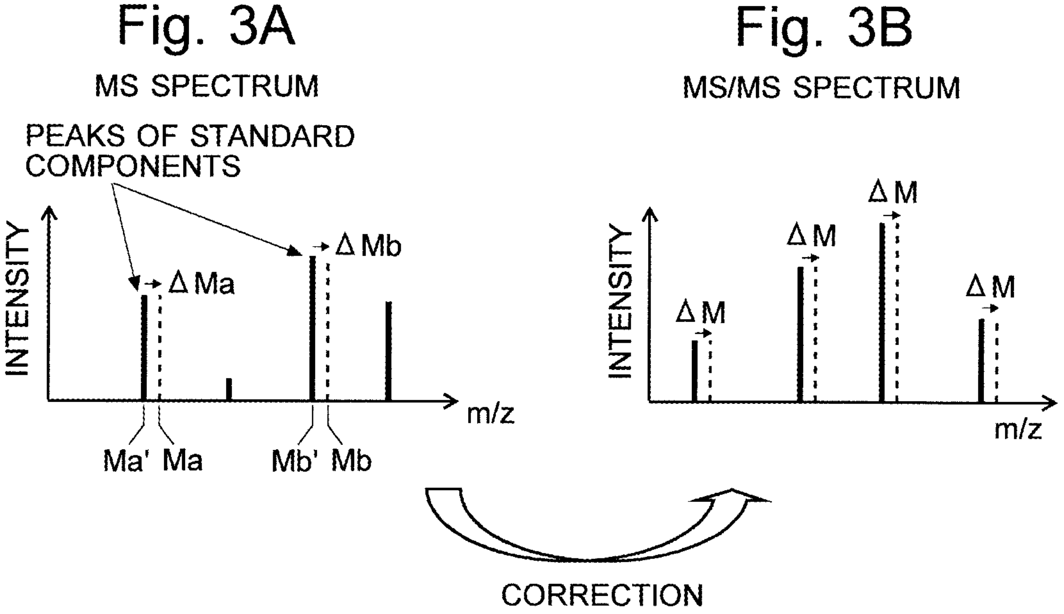

TANDEM MASS SPECTROMETER

CROSS REFERENCE TO RELATED APPLICATIONS

This application is a National Stage of International Application No. PCT/JP2015/078516 filed Oct. 7, 2015.

TECHNICAL FIELD

The present invention relates to a tandem mass spectrometer for fragmenting an ion having a specific mass-to-charge ratio m/z within a collision cell by a collision-induced dissociation (CID) or similar process, and for performing a mass spectrometric analysis of the thereby generated product ions (fragment ions).

BACKGROUND ART

An MS/MS analysis (tandem analysis), which is a technique of mass spectrometry, is a useful technique for identifying a high-molecular compound and/or analyzing its chemical structure. In recent years, this technique has been widely used in various areas. A commonly known type of mass spectrometer for performing an MS/MS analysis is a triple quadrupole mass spectrometer including two quadrupole mass filters respectively placed before and after a collision cell in which the CID process is performed. A so-called Q-TOF mass spectrometer, which has a time-of-flight mass analyzer in place of the rear quadrupole mass filter in the triple quadrupole mass spectrometer, is more complex in structure and more expensive than the triple quadrupole mass spectrometer yet is capable of acquiring more accurate mass spectra. In the present description, a mass spectrometer which has two mass analyzers respectively placed before and after a collision cell and can perform an MS/MS analysis is called the "tandem mass spectrometer".

In general, time-of-flight mass analyzers can determine the mass-to-charge ratios of ions with higher accuracy and higher mass-resolving power than quadrupole mass analyzers. Therefore, Q-TOF mass spectrometers have been increasingly and widely used in areas in which a precise measurement of product ions is required, such as the identification or quantitative determination of proteins or peptides, or simultaneous analysis of a large number of compounds having similar structures. A precise measurement of target ions in mass spectrometry normally includes the task of mass calibration using the result of a measurement of a standard sample containing a component having a mass-to-charge ratio whose theoretical value is previously known.

For example, Patent Literature 1 discloses a technique for a high-precision mass calibration in an ion-trap time-of-flight mass spectrometer (which is hereinafter abbreviated as the "IT-TOFMS") in which an ion trap capable of retaining ions as well as performing a selection from the retained ions or dissociation of the ions by CID is combined with a time-of-flight mass analyzer.

In the IT-TOFMS, after various ions derived from a target sample to be analyzed and the ion derived from a standard sample are both captured within the ion trap, an ion having a specific mass-to-charge ratio among the various ions derived from the target sample and the ion derived from the standard sample are exclusively retained within the ion trap while the other ions are removed from the ion trap. Subsequently, the remaining ion derived from the target sample is selectively made to oscillate to promote their fragmentation by CID and generate product ions originating from the target sample. During this operation, the ion derived from the standard sample is retained within the ion trap. Then, the product ions derived from the target sample and the ion derived from the standard sample are ejected from the ion trap into the time-of-flight mass analyzer to measure the time of flight of each of those ions. Based on the thereby obtained time of flight of the ion derived from the standard sample or the actual value of the mass-to-charge ratio calculated from the time of flight, the mass-to-charge ratios of the product ions derived from the target sample are corrected.

Thus, the IT-TOFMS can selectively dissociate only an ion originating from a target sample while retaining an ion originating from a standard sample within the ion trap without causing the dissociation of the latter ion. This allows both the product ions originating from the target sample and the non-dissociated ion originating from the standard sample to be simultaneously subjected to a mass spectrometric measurement and thereby enable a high-precision mass correction. By comparison, a tandem mass spectrometer, in which ions undergo dissociation while passing through the collision cell, cannot simultaneously perform a mass spectrometric analysis of both the product ions originating from the target sample and the non-dissociated ion originating from the standard sample. As is also noted in Patent Literature 1, the mass calibration by the internal standard method as used in the previously described IT-TOFMS cannot be performed in the Q-TOF mass spectrometer.

CITATION LIST

Patent Literature

Patent Literature 1: JP 2005-181236 A

SUMMARY OF INVENTION

Technical Problem

The IT-TOFMS has the advantage of being capable of an $MS^n$ measurement with n being equal to or greater than three. However, the device is expensive. It also has a disadvantage in measurement sensitivity since only a small amount of ions can be accumulated within the ion trap. Furthermore, the necessity of ion-cooling and other operations for accumulating ions within the ion trap causes problems, such as the long period of time for one measurement, low level of throughput, and the low accuracy of the peak waveform of a chromatogram due to the long intervals between the measurement points in the case where the device is combined with a liquid chromatograph (LC) or gas chromatograph (GC). Provided that it is unnecessary to perform an $MS^n$ analysis with n being equal to or greater than three (i.e., if an $MS^2$ analysis can yield a satisfactory result), tandem mass spectrometers, such as Q-TOF mass spectrometers, have advantages over the IT-TOFMS in that they are inexpensive, highly sensitive and capable of creating a chromatogram having a peak waveform with high accuracy and reproducibility due to the short period of time per one measurement in the case where the device is combined with an LC or GC.

The present invention has been developed in view of those points. Its objective is to provide a tandem mass spectrometer, such as a Q-TOF mass spectrometer or triple quadrupole mass spectrometer, capable of performing a high-accuracy mass correction using the result of a measurement of a standard sample and thereby perform a precise measurement of the masses of the product ions in.

Solution to Problem

A tandem mass spectrometer according to the first aspect of the present invention developed for solving the previously described problem is a tandem mass spectrometer including: a first mass separator for selecting, as a precursor ion, an ion having a specific mass-to-charge ratio from ions originating from a sample; a collision cell for dissociating the precursor ion; and a second mass separator for performing a mass spectrometric analysis of various product ions generated by the dissociation, the tandem mass spectrometer further including:

a) an analysis controller for controlling relevant sections so as to repeat, within a predetermined time range, a cycle in which a scan measurement for carrying out a mass scan over a predetermined mass-to-charge-ratio range in the first mass separator or the second mass separator without dissociating an ion within the collision cell, and a product-ion scan measurement for carrying out a mass scan over a predetermined mass-to-charge-ratio range in the second mass separator while dissociating an ion within the collision cell, are each performed at least one time; and b) a correction processor for correcting the mass-to-charge ratio of a product ion originating from a component in a target sample obtained by perfoiming the product-ion scan measurement for the component under the control of the analysis controller, using the mass-to-charge ratio of an ion originating from a standard component whose mass is precisely known, where the latter mass-to-charge ratio is obtained by the scan measurement carried out within the same cycle as the product-ion scan measurement concerned or by the last scan measurement carried out before the cycle concerned.

In the tandem mass spectrometer according to the present invention, the techniques for the mass separation in the first and second mass separators are not specifically limited. Typically, a quadrupole mass filter may be used as the first mass separator, while a quadrupole mass filter or time-of-flight mass separator may be used as the second mass separator. The technique for dissociating ions within the collision cell is not also specifically limited. A commonly used technique is the collision induced dissociation.

In the tandem mass spectrometer according to the first aspect of the present invention, when a precise measurement of the mass of a product ion originating from a target sample needs to be performed, a standard sample containing one or more standard components whose precise masses are previously known is introduced into the device, for example, along with the target sample. If there is an LC or GC connected to the front side of the present tandem mass spectrometer to separate components by the LC or GC, the standard sample may be introduced into the present device by being added to the sample containing the separated components, or it may be introduced into the ion source of the present device in parallel to the sample containing the components separated by the LC or GC. By any of these methods, the standard sample can be continuously introduced.

The tandem mass spectrometer according to the first aspect of the present invention performs a measurement by controlling the relevant sections according to a measurement sequence which is previously set, for example, by an analysis operator. Accordingly, for example, the analysis operator sets a control sequence for repeating, within a predetermined time range, a cycle in which the following two measurements are each performed at least one time: a scan measurement over a predetermined mass-to-charge-ratio range including the mass-to-charge ratio of an ion originating from the standard component, and a product-ion scan measurement over a predetermined mass-to-charge-ratio range using, as the precursor ion, an ion originating from a target component in a target sample. The analysis controller performs the measurements by controlling the relevant sections according to the control sequence which has been set in this manner, whereby a set of data which form a mass spectrum within the predetermined mass-to-charge-ratio range (MS spectrum) is obtained by each scan measurement, while a set of data which form an MS/MS spectrum within the predetermined mass-to-charge-ratio range is obtained by each product-ion scan measurement.

When an MS/MS spectrum is obtained by a product-ion scan measurement at one point in time, a peak of an ion originating from the standard component should be observed on a mass spectrum obtained by a scan measurement performed within the same cycle as the product-ion scan measurement concerned or by a scan measurement performed within another cycle immediately before the cycle concerned. The correction processor calculates the difference (displacement) between the measured value of the mass-to-charge ratio of the ion derived from the standard component observed on the mass spectrum obtained by the scan measurement in this manner and the known accurate value (e.g. theoretical value) of the mass-to-charge ratio of the same ion. Based on this difference, the same processor corrects the mass-to-charge ratio of each peak on the MS/MS spectrum, i.e. each product ion derived from the target component. Thus, the mass-to-charge ratios of the product ions are corrected using the result of a measurement performed at substantially the same point in time. Needless to say, the mass-to-charge ratios of the ions derived from any component (inclusive of the target component) other than the standard component observed on the mass spectrum can also be corrected using the mass-to-charge ratio of the ion derived from the standard component.

The number of standard components may be one. However, it is often the case that the amount of displacement of the mass-to-charge ratio changes depending on the magnitude of the mass-to-charge ratio. Accordingly, it is preferable to use a plurality of standard components having different mass-to-charge ratios and create a computing formula or similar model which expresses an approximate relationship between the mass-to-charge ratio and the amount of displacement, based on the amount of displacement of the mass-to-charge ratio of the ion originating from each standard component. In this case, a scan measurement over a wide range of mass-to-charge ratios may be performed to cover all ions originating from the plurality of standard components. Alternatively, a plurality of scan measurements each of which covers a different narrow range of mass-to-charge ratios may be performed for each standard component within one cycle.

In the tandem mass spectrometer according to the first aspect of the present invention, there are several possible methods for selecting a scan measurement (or mass spectrum) to be used for correcting the mass-to-charge ratios of the product ions on an MS/MS spectrum obtained at a certain point in time. For example, a scan measurement carried out within the same cycle as the product-ion scan measurement may be automatically selected, or the last scan measurement carried out before the product-ion scan measurement may be automatically selected regardless of whether or not the last scan measurement has been performed within the same cycle as the product-ion scan measurement. It is also possible to allow an analysis operator, i.e. a user, to previously select a scan measurement to be used for correcting the mass-to-charge ratios of the product ions.

As another possible method, a scan measurement over a predetermined mass-to-charge-ratio range may be repeatedly carried out throughout the measurement time from the beginning to the end of the entire measurement, and a scan measurement carried out within the same cycle as the product-ion scan measurement or the last scan measurement carried out before the product-ion scan measurement may be automatically selected, regardless of whether or not the analysis operator has performed the manual setting in the previously described manner.

A tandem mass spectrometer according to the second aspect of the present invention developed for solving the previously described problem is a tandem mass spectrometer including: a first mass separator for selecting, as a precursor ion, an ion having a specific mass-to-charge ratio from ions originating from a sample; a collision cell for dissociating the precursor ion; and a second mass separator for performing a mass spectrometry analysis of various product ions generated by the dissociation, the tandem mass spectrometer further including:

a) a first analysis controller for controlling relevant sections to perform a scan measurement for carrying out a mass scan over a predetermined mass-to-charge-ratio range in the first mass separator or the second mass separator without dissociating an ion within the collision cell;

b) a second analysis controller for controlling relevant sections to perform a scan measurement for carrying out a mass scan over a predetermined mass-to-charge-ratio range in the second mass separator while dissociating an ion within the collision cell; and c) a correction processor for correcting the mass-to-charge ratio of a product ion originating from a component in a target sample obtained by performing the product-ion scan measurement for the component under the control of the second analysis controller at a point in time where a predetermined period of time elapses from the beginning of the measurement, using the mass-to-charge ratio of an ion originating from a standard component whose mass is precisely known, where the latter mass-to-charge ratio is obtained by performing the scan measurement for a sample containing the standard component under the control of the first analysis controller at the point in time where the predetermined period of time elapses from the beginning of the measurement.

In the tandem mass spectrometer according to the second aspect of the present invention, when the scan measurement is performed under the control of the first analysis controller, a standard sample which contains at least one or a plurality of standard components is introduced into the device. On the other hand, when the product-ion scan measurement is performed under the control of the second analysis controller, it is unnecessary to introduce the standard sample into the device; only the target sample needs to be introduced into the device. That is to say, unlike the tandem mass spectrometer according to the first aspect of the present invention, the tandem mass spectrometer according to the second aspect of the present invention does not require the standard sample to be introduced into the device along with the target sample. The scan measurement for the standard sample and the product-ion scan measurement for the target sample are separately perfoiined within different periods of time.

In the process of correcting the mass-to-charge ratios of the product ions derived from a component in the target sample obtained by performing the product-ion scan measurement for the component at a point in time where a predetermined period of time has elapsed since the beginning of the measurement, the correction processor calculates the difference between the measured value and the known correct value of the mass-to-charge ratio of the ion derived from the standard component observed on the mass spectrum obtained by performing the scan measurement for the standard sample at a point in time where the same predetermined period of time has elapsed since the beginning of the measurement. Based on this difference, the correction processor corrects the mass-to-charge ratio of each peak on the MS/MS spectrum obtained by the product-ion scan measurement, i.e. the mass-to-charge ratios of the product ions derived from the target component. In this case, the MS/MS spectrum to be corrected and the mass spectrum used for calculating the difference, i.e. the amount of mass displacement, are obtained at different points in time. However, both spectra are obtained at a point in time where the same period of time has elapsed since the beginning of the measurement. Accordingly, even when the amount of mass displacement may drift with the passage of time from the beginning of the measurement, the influence of the drift on the change in the amount of mass displacement will be reduced, so that the mass-to-charge ratios of the product ions can be accurately determined.

Advantageous Effects of the Invention

The tandem mass spectrometer according to the first aspect of the present invention can correct the mass-to-charge ratios of the product ions originating from a component in a target sample, using a precise mass and a measured result of the mass-to-charge ratio of an ion originating from a standard component obtained by a normal scan measurement, i.e. a scan measurement without the dissociation of an ion, performed at substantially the same point in time as the product-ion scan measurement for the product ions originating from the component in the target sample. Accordingly, the correction can be performed at substantially the same level of accuracy as the internal standard method, and the mass-to-charge ratios of the product ions originating from the target component can be determined with high accuracy.

In the tandem mass spectrometer according to the second aspect of the present invention, even when the amount of mass displacement may drift with the passage of time from the beginning of the measurement, the influence of the drift on the change in the amount of mass displacement can be reduced, and the mass-to-charge ratio of the product ion originating from the target component can be accurately determined.

As described in Patent Literature 1, in the case of correcting the mass-to-charge ratios of the product ions observed on an MS/MS spectrum in an IT-TOFMS, an ion peak originating from the standard component appears on the obtained MS/MS spectrum. By comparison, in tandem mass spectrometers, such an ion peak originating from the standard component will not normally be observed on the MS/MS spectrum even when a standard sample is introduced into the device along with the target sample. Accordingly, with the tandem mass spectrometer according to the first aspect of the present invention, an MS/MS spectrum on which only the product-ion peaks originating from the target component in the target sample are purely observed can be obtained, and yet the mass-to-charge ratios of those product ions originating from the target component appearing on the MS/MS spectrum can be determined with high accuracy.

BRIEF DESCRIPTION OF DRAWINGS

FIG. 2 a schematic diagram showing one example of the event setting in the LC-MS in the first embodiment.

FIGS. 3A and 3B are diagram illustrating the mass correction of an MS/MS spectrum in the LC-MS in the first embodiment.

DESCRIPTION OF EMBODIMENTS

First Embodiment

Figure 1:
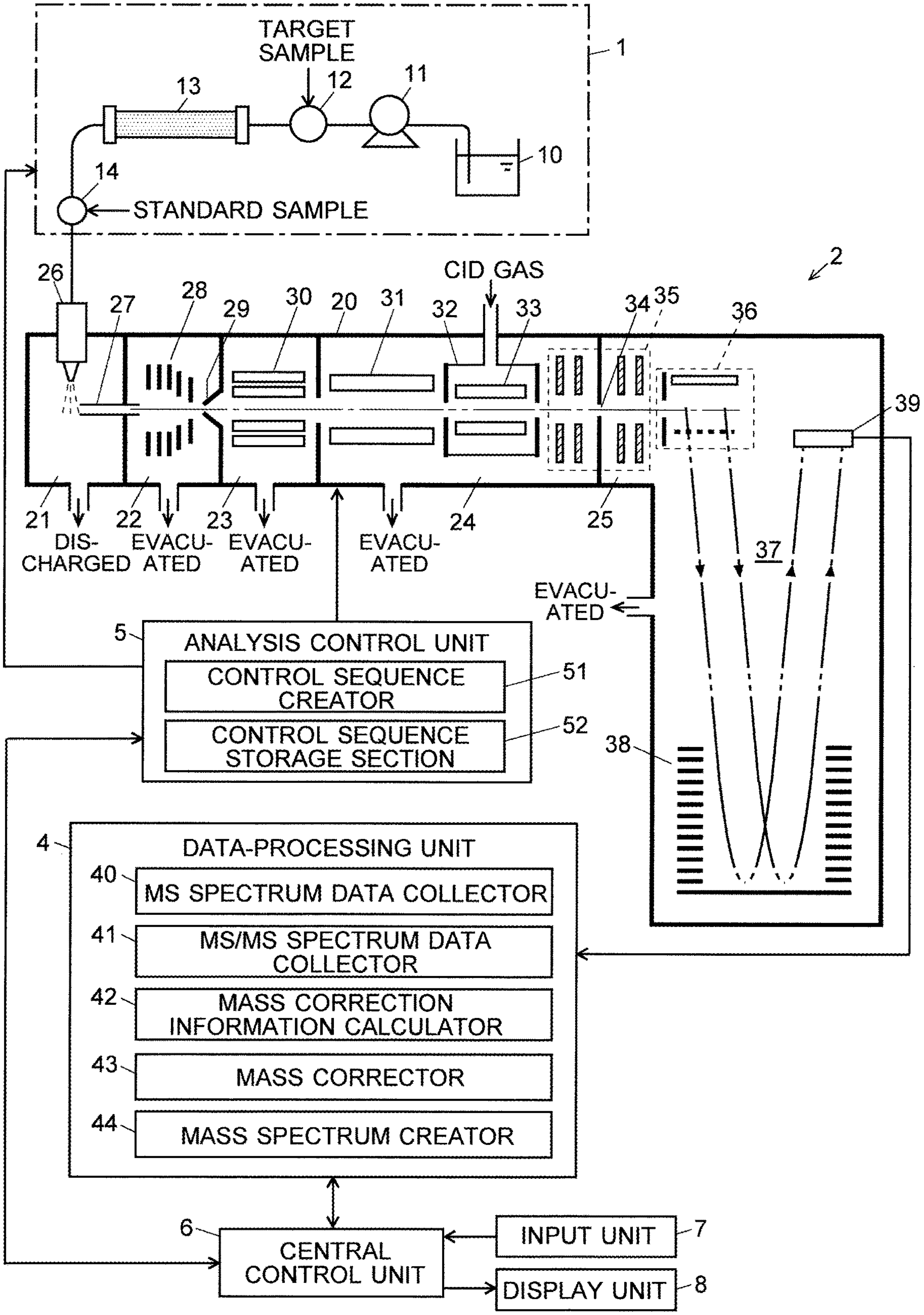
FIG. 1 is a configuration diagram showing the main components of the first embodiment of an LC-MS using a tandem mass spectrometer according to the present invention.

One embodiment of the liquid chromatograph mass spectrometer (LC-MS) using a tandem mass spectrometer according to the present invention is hereinafter described with reference to the attached drawings. FIG. 1 is a configuration diagram showing the main components of the LC-MS in the present embodiment.

In an LC unit 1, a liquid-sending pump 11 draws a mobile phase from a mobile phase container 10 and sends it to an injector 12 at a constant flow velocity. A sample liquid injected into the mobile phase at a predetermined timing in the injector 12 is carried by the flow of the mobile phase into a column 13. The various components contained in the sample liquid are separated from each other while passing through the column 13. At a mixer 14, a specific amount of standard sample is mixed in the eluate exiting from the outlet of the column 13. This eluate, in which the standard sample has been mixed, is supplied to the ion source of a mass spectrometer unit 2, which is a Q-TOF mass spectrometer.

The mass spectrometer unit 2 has a chamber 20, in which a first intermediate vacuum chamber 22, second intermediate vacuum chamber 23 and first analysis chamber 24 are provided having their degrees of vacuum sequentially increased from an ionization chamber 21 maintained at a substantially atmospheric pressure to a second analysis chamber 25 maintained in a high-vacuum state. That is to say, the mass spectrometer unit 2 has the configuration of a multi-stage differential pumping system. An ESI spray 26 which performs ionization by an electrospray ionization (ESI) method is provided as the ion source within the ionization chamber 21. The ionization chamber 21 communicates with the first intermediate vacuum chamber 22 through a heated desolvation tube 27. The first and second intermediate vacuum chambers 22 and 23 respectively contain ion guides 28 and 30 for transporting ions to the subsequent stage while converging them. The first intermediate vacuum chamber 22 communicates with the second intermediate vacuum chamber 23 through the small hole formed at the apex of a skimmer 29.

The first analysis chamber 24 contains a quadrupole mass filter 31 as the first mass separator and a collision cell 32 having a multipole ion guide 33 provided inside. The second analysis chamber 25 contains an orthogonal acceleration reflectron time-of-flight mass analyzer as the second mass separator and an ion detector 39. The orthogonal acceleration reflectron time-of-flight mass analyzer includes an orthogonal accelerator 36, flight space 37, and reflector 38. An ion guide 35 is provided between the collision cell 32 and the orthogonal accelerator 36. An ion passage hole 34 formed in the partition wall between the first and second analysis chambers 24 and 25 is sandwiched in the middle of the ion guide 35.

An analysis control unit 5 includes a control sequence creator 51 and control sequence storage section 52. This unit controls the operations of the components included in the LC unit 1 and the mass spectrometer unit 2. A data-processing unit 4 receives detection signals from the ion detector 39. This unit includes an MS spectrum data collector 40, MS/MS spectrum data collector 41, mass correction information calculator 42, mass corrector 43, and mass spectrum creator 44 as its functional blocks. A central control unit 6 functions as the general controller of the entire system as well as the user interface. An input unit 7 and display unit 8 are connected to this unit.

As a typical configuration, the functions included in the central control unit 6 and the data-processing unit 4 can be partially or entirely realized by executing, on a personal computer (or workstation), a dedicated software program installed on the same computer.

An operation of the mass spectrometer unit 2 in performing an MS/MS measurement is hereinafter schematically described.

An eluate from the column 13 of the LC unit 1 is introduced into the ESI spray 26. The ESI spray 26 atomizes the eluate while imparting an imbalanced polarity of electric charges to the eluate. The electrically charged droplets come in contact with the atmospheric gas and become broken into smaller sizes, causing the solvent to vaporize. Through this process, the components in the droplets are ionized. The generated ions are transported through the desolvation tube 27, ion guides 28 and 30 into the quadrupole mass filter 31. Under the control of the analysis control unit 5, a voltage which allows only an ion having a specific mass-to-charge ratio to pass through is applied to the quadrupole mass filter 31. Thus, only an ion having a specific mass-to-charge ratio among the various ions originating from the sample components is selectively allowed to pass through the quadrupole filter 31 as the precursor ion and be introduced into the collision cell 32.

Meanwhile, a CID gas, such as helium or argon, is introduced into the collision cell 32. Upon coming in contact with the CID gas, the precursor ion undergoes dissociation, whereby product ions are generated. The generated product ions are transported through the ion guide 35 into the orthogonal accelerator 36. The orthogonal accelerator 36 accelerates the stream of ions in a direction substantially orthogonal to the stream at predetermined intervals of time, to send the ions into the flight space 37. Those ions are returned by an electric field created by the reflector 38 and eventually reach the ion detector 39. Ions which began their flight at almost the same point in time are separated from each other according to their mass-to-charge ratios during their flight and sequentially arrive at the ion detector 39 in ascending order of the mass-to-charge ratio.

Accordingly, in the data-processing unit 4, a time-of-flight spectrum which shows the relationship between the time of flight and signal intensity of each ion can be obtained, with the point of acceleration of the ions in the orthogonal accelerator 36 (i.e. the point in time when the ions began their flight) defined as a time-of-flight value of zero. The relationship between the mass-to-charge ratio and time of flight can be determined beforehand. Based on this relationship, the time of flight can be converted into mass-to-charge ratio to obtain a mass spectrum (MS/MS spectrum) from the time-of-flight spectrum. One mass spectrum covering a predetermined mass-to-charge-ratio range can be obtained every time the ions are accelerated in a pulsed form in the orthogonal accelerator 36. By repeating this operation at predetermined intervals of time, an MS/MS spectrum can be obtained for each of the various components which sequentially emerge in the eluate with the passage of time while the eluate is being introduced from the LC unit 1 into the mass spectrometer unit 2.

As just described, an MS/MS spectrum for a specific precursor ion originating from a sample component can be obtained by the mass spectrometer unit 2. Furthermore, an MS measurement in a similar manner to a normal time-of-flight mass spectrometer can also be performed to obtain a mass spectrum by omitting the selection of the precursor ion from the ions originating from the sample component in the quadrupole mass filter 31 as well as stopping the introduction of the CID gas into the collision cell 32 to prevent the dissociation of the ions.

The LC-MS in the first embodiment can obtain an MS/MS spectrum for each of the target components in a target sample which have been temporally separated by the LC unit 1. However, for a high-accuracy determination of the mass-to-charge ratio of each ion observed on the MS/MS spectrum, it is necessary to perform a mass correction using a measured mass-to-charge ratio of the standard component in the standard sample. Accordingly, a characteristic mass correction is performed, as will be hereinafter described.

In advance of the execution of the measurement, the analysis operator using the input unit 7 sets the measurement mode to be performed in the mass spectrometer unit 2 as well as the measurement conditions in that measurement mode. In the present embodiment, the measurement mode and its measurement conditions are specified in the unit called the "event". FIG. 2 is a schematic diagram showing an example of the event setting.

In the case where an MS/MS measurement needs to be carried out for a target component which is expected to be introduced into the mass spectrometer unit 2 within a specific time range, one event is set so that a product-ion scan measurement (MS/MS measurement) over a predetermined mass-to-charge-ratio range of M3-M4, with an ion originating from the target component as the precursor ion (m/z=Mp), will be carried out for a predetermined time range of t3-t4. Furthermore, another event is set so that a scan measurement (MS measurement) over a predetermined mass-to-charge-ratio range of M1-M2 including the mass-to-charge ratio of an ion originating from a standard component will be carried out for a predetermined time range of t1-t2 (where t1≤t3 and t4≤t2). In this case, the two events overlap each other within a time range of t3-t4, as shown in FIG. 2. Within a period of time where a plurality of events overlap each other in this manner, a cycle is repeated in which a plurality of measurements are individually and sequentially performed according to their respective measurement conditions specified in those events. The length of time of one cycle in which each of the plurality of events is performed one time is hereinafter called the "loop time". In the example shown in FIG. 2, the MS/MS measurement for the target component will be performed once in every loop time tL. Based on the measurement conditions and other related information previously set in this manner, the control sequence creator 51 creates a control sequence and stores it in the control sequence storage section 52.

As described earlier, when the measurement is carried out, the analysis control unit 5 controls the operation of the relevant sections according to the control sequence stored in the control sequence storage section 52. Accordingly, a set of data foiining an MS spectrum over the mass-to-charge-ratio range M1-M2, and a set of data forming an MS/MS spectrum over the mass-to-charge-ratio range M3-M4, are alternately obtained within the time range of t3-t4 shown in FIG. 2. The MS spectrum data collector 40 in the data-processing unit 4 collects the data forming the MS spectrum and stores them in its internal memory, while the MS/MS spectrum data collector 41 collects the data forming the MS/MS spectrum and stores them in its internal memory. Since the standard sample is almost continuously introduced into the mass spectrometer unit 2, an ion peak originating from the standard component appears in each of the repeatedly obtained MS spectra.

FIGS. 3A and 3B are diagram illustrating the mass correction of an MS/MS spectrum. Specifically, FIG. 3A is an MS spectrum obtained at a point in time within the time range of t3-t4, while FIG. 3B is an MS/MS spectrum obtained at the same point in time (within the same cycle).

In the present example, it is assumed that there are two kinds of standard components, as shown in FIG. 3A. The theoretical values of the mass-to-charge ratios of the ions originating from those standard components are Ma and Mb, while their measured values are Ma' and Mb'. Accordingly, a mass displacement of $Ma-Ma'=\Delta Ma$ exists for one standard component, while a mass displacement of $Mb-Mb'=\Delta Mb$ exists for the other standard component. The mass correction information calculator 42 calculates, for each MS spectrum, the difference between the measured value of each mass-to-charge ratio observed on the MS spectrum and the known theoretical value of the mass-to-charge ratio, and temporarily stores the calculated result as the mass correction information.

The mass corrector 43 corrects the mass-to-charge ratio of each ion peak observed on the MS spectrum other than the ions derived from the standard components, using the mass correction information obtained from the ions derived from the standard components on the same MS spectrum. For example, an average of the amounts of mass displacement at the two standard components, $(\Delta Ma+\Delta Mb)/2$, can be used to correct the mass-to-charge ratio of each ion peak. As another example, a correction line which approximately represents the relationship between the mass-to-charge ratio and the mass displacement by a straight line can be determined from the relationship between the mass-to-charge ratios and the amounts of mass displacement at the two standard components. This correction line can be used to calculate the amount of mass displacement at the mass-to-charge ratio of each ion peak, and this amount of mass displacement can be used to correct the mass-to-charge ratio concerned. The correction in those examples uses the result of an actually and simultaneously performed measurement. Therefore, it is a form of the mass correction by the internal standard method.

On the other hand, no ion peak originating from the standard components is normally observed on the MS/MS spectrum. Accordingly, for each product-ion peak derived from the target component observed on the MS/MS spectrum, the mass corrector 43 corrects the mass-to-charge ratio using the mass correction information obtained from the ions derived from the standard components on the MS spectrum obtained by the MS measurement carried out in the same cycle as the MS/MS measurement in which the MS/MS spectrum concerned has been obtained. As already described, in the case where a plurality of standard components have been used, an average value of the amounts of mass displacement at those standard components may be used to correct the mass-to-charge ratio of each product-ion peak, or a correction line which approximately represents the relationship between the mass-to-charge ratio and the mass displacement by a straight or curved line may be determined, and this line may be used to calculate the amount of mass displacement at the mass-to-charge ratio of each product-ion peak and correct the mass-to-charge ratio using this amount of mass displacement. As shown in FIG. 2, the MS measurement and the MS/MS measurement are not simultaneously performed in the strict sense. However, the time ranges in which the MS measurement and the MS/MS measurement are respectively performed within the same cycle are extremely close to each other, so that it is possible to consider that the two measurements are simultaneously performed in a practical sense. Accordingly, the mass calibration can be performed at almost the same level of accuracy as the mass calibration by the internal standard method.

The mass spectrum creator 44 creates an MS spectrum and MS/MS spectrum, using the data in which the mass displacement has been corrected using the result of the measurement of the standard components in the previously described manner, and displays those spectra on the screen of the display unit 8. Thus, the LC-MS in the present embodiment can present, to the analysis operator, an MS spectrum and MS/MS spectrum in which the mass displacement has been corrected with high accuracy.

In the example shown in FIG. 2, there are two events overlapping the same segment of time. It is also possible to set three or more events overlapping the same segment of time. For example, a plurality of scan measurements with different mass-to-charge-ratio ranges may be carried out within the same segment of time, or a plurality of product-ion scan measurements with different mass-to-charge ratios of the precursor ion and different mass-to-charge-ratio ranges to be scanned may be carried out within the same segment of time.

Figure 4:
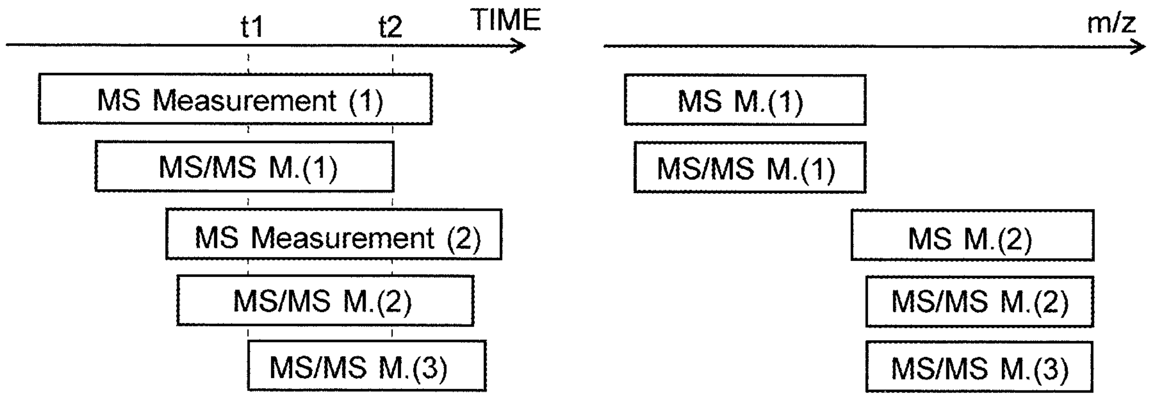
FIG. 4 is a schematic diagram showing another example of the event setting in the LC-MS in the first embodiment.

FIG. 4 is a schematic diagram showing another example of the event setting. The left half shows each event on the time axis, while the right half shows each event on the m/z axis. In the present example, there are five events within one cycle: two scan measurements (MS measurements) and three product-ion scan measurements (MS/MS measurements) overlap each other within the time range of t1-t2. Accordingly, there are two MS spectra available for the correction of the mass-to-charge ratios of the product-ion peaks observed on one MS/MS spectrum. In correcting the mass-to-charge ratios of the product-ion peaks observed on an MS/MS spectrum, the mass corrector 43 uses the mass correction information determined on the basis of an ion derived from a standard component on the MS spectrum obtained by the last MS measurement carried out before the MS/MS measurement in which the MS/MS spectrum concerned has been obtained.

For example, in the case of FIG. 4, if the five events in FIG. 4 are sequentially performed from top to bottom within each cycle during the time range of t1-t2, the mass correction information determined on the basis of an ion derived from a standard component observed on the MS spectrum obtained in the event labeled "MS Measurement (1)" or "MS M.(1)" is used for the correction of the mass-to-charge ratios of the product-ion peaks observed on the MS/MS spectrum obtained in the event labeled "MS/MS M.(1)". The mass correction information determined on the basis of an ion derived from a standard component observed on the MS spectrum obtained in the event labeled "MS Measurement (2)" or "MS M.(2)" is used for the correction of the mass-to-charge ratios of the product-ion peaks observed on the MS/MS spectrum obtained in each of the events labeled "MS/MS M.(2)" and "MS/MS M.(3)". Thus, even when a number of measurements are carried out within one cycle, the mass displacement in each of the MS/MS-measurement results can be corrected using the result of an MS measurement which can practically be regarded as having been simultaneously performed. Accordingly, the mass calibration can be performed at almost the same level of accuracy as the mass calibration by the internal standard method.

Figure 5:
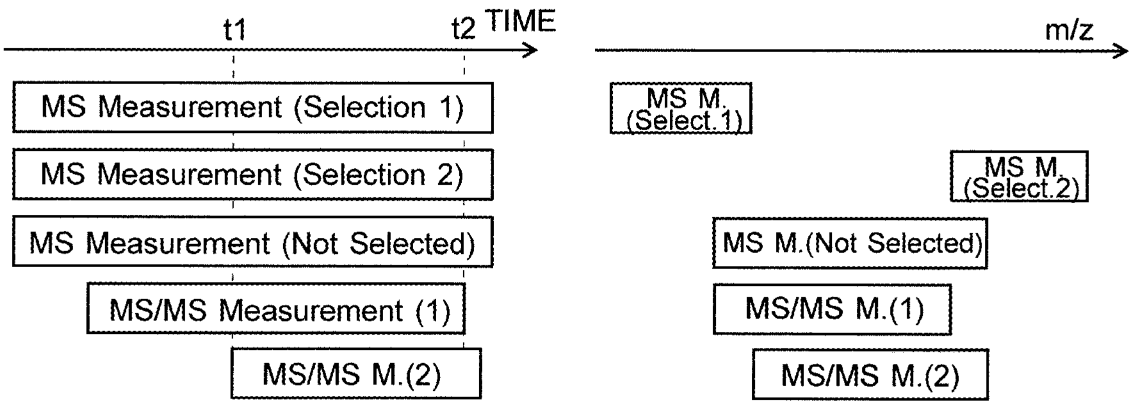
FIG. 5 is a schematic diagram showing another example of the event setting in the LC-MS in the first embodiment.

In the examples shown in FIGS. 2 and 4, the MS spectrum for calculating the mass correction information to be used for the correction of the mass-to-charge ratios of the product-ion peaks observed on an MS/MS spectrum is automatically selected. It is also possible to allow an analysis operator to manually select the MS spectrum. FIG. 5 is a schematic diagram showing an example of the event setting in such a case. In the present example, the analysis operator previously designates two MS measurements as the MS measurements from which the MS spectra used for determining the mass correction information should be obtained (the events labeled "MS Measurement (Selection 1)" or "MS M. (Select. 1)" and "MS Measurement (Selection 2)" or "MS M. (Select. 2)" in FIG. 5), where one of the two scan measurement covers a lower mass-to-charge-ratio range including an ion originating from one standard component while the other scan measurement covers a higher mass-to-charge-ratio range including an ion originating from another standard component. This designation can be made, for example, in the event setting.

When such a designation has been made, the mass correction information calculator 42 calculates mass correction information based on the mass-to-charge ratios of the ions derived from the standard components observed on the MS spectra obtained by the two MS measurements. The mass corrector 43 uses this mass correction information for the correction of the mass displacement of not only the ion peaks other than the standard components on those two MS spectra but also the ion peaks on the MS spectrum obtained by another MS measurement which overlaps the same segment of time (the event labeled "MS Measurement (Not Selected)" or "MS M. (Not Selected)" in FIG. 5). The same mass correction information is also used for the correction of the mass displacement of the product-ion peaks derived from the target component on the MS/MS spectra obtained by the two MS/MS measurements within the same cycle.

Figure 6:
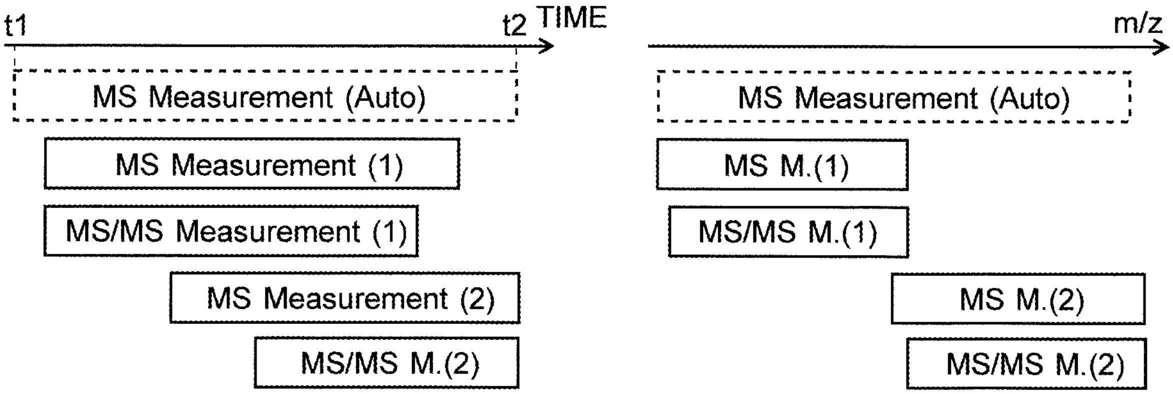
FIG. 6 is a schematic diagram showing another example of the event setting in the LC-MS in the first embodiment.

In any of the previously described examples, the analysis operator needs to manually set the event of the MS measurement for obtaining the MS spectrum to be used for calculating the mass correction information. The device may be configured so that such a manual task can be omitted. Specifically, the control sequence creator 51 creates a control sequence after automatically setting an event in which a scan measurement (MS measurement) over a predetermined mass-to-charge-ratio range including the mass-to-charge ratio of an ion originating from a standard component is repeatedly performed throughout the entire measurement time, apart from an event which is set by the analysis operator as needed. FIG. 6 is a schematic diagram showing an example of the event setting in such a case. The event labeled "MS Measurement (Auto)" is the event for the MS measurement automatically set without requiring the manual setting by the analysis operator.

The mass correction information calculator 42 calculates mass correction information in each cycle, based on the mass-to-charge ratio of an ion derived from a standard component observed on an MS spectrum obtained by the MS measurement which is automatically carried out. The mass corrector 43 uses this mass correction information for the correction of the mass displacement of each ion peak on the MS spectra and MS/MS spectra obtained by all MS measurements and MS/MS measurements carried out within that cycle.

Second Embodiment

An LC-MS as a second embodiment using a tandem mass spectrometer according to the present invention is hereinafter described with reference to FIGS. 7A and 7B. The basic configuration of the LC-MS in the second embodiment is similar to the first embodiment. Therefore, its detailed descriptions will be omitted. It should be noted that the LC-MS in the second embodiment selectively introduces either the eluate exiting from the column 13 or the standard sample into the mass spectrometer unit 2, instead of mixing the standard sample in the eluate. Accordingly, a passage-switching valve is provided in place of the mixer 14 in the configuration diagram shown in FIG. 1.

Figure 7A:
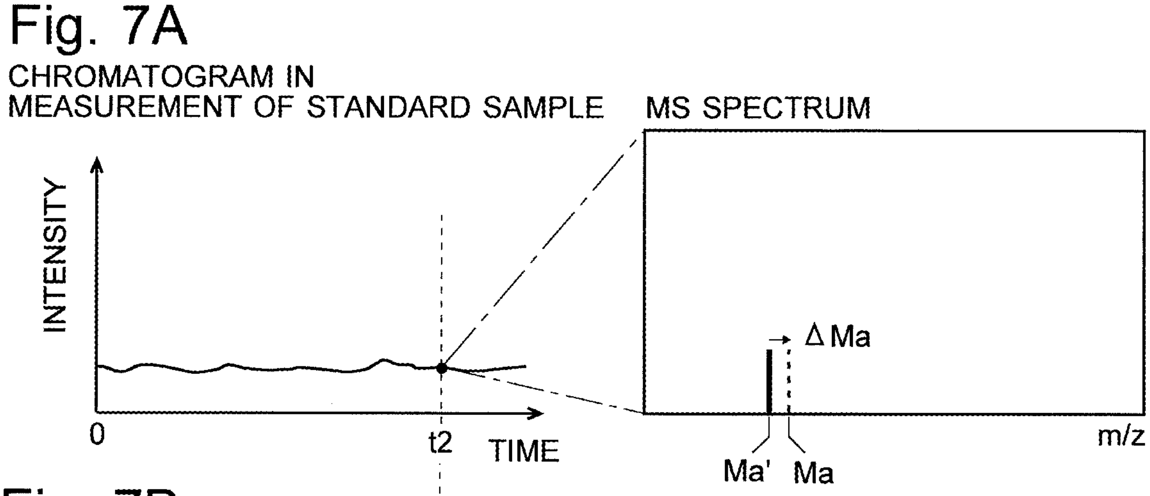
FIGS. 7A and 7B are diagrams illustrating the mass correction of an MS/MS spectrum in the LC-MS in the second embodiment.
Figure 7B:
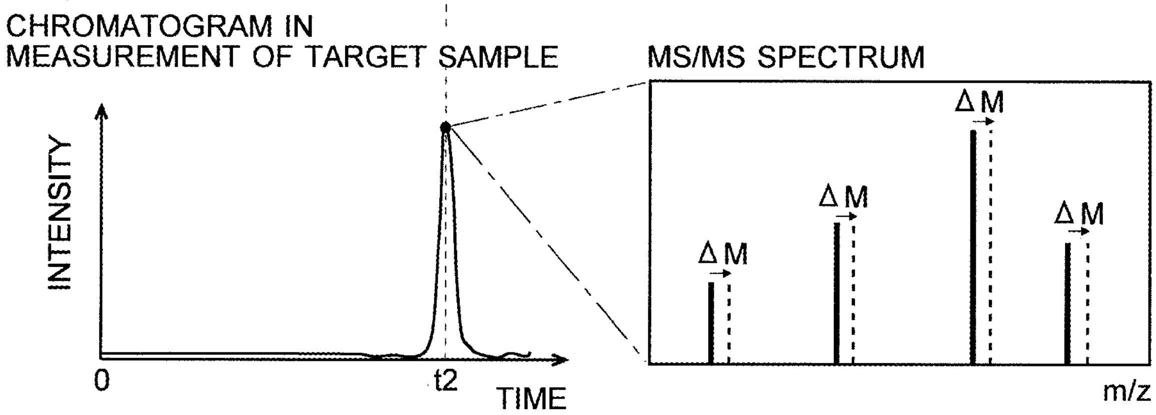

FIGS. 7A and 7B are diagrams illustrating the mass correction of an MS/MS spectrum in the LC-MS in the second embodiment. In the LC-MS in the second embodiment, under the control of the analysis control unit 5, the aforementioned valve is switched to selectively introduce a standard sample into the mass spectrometer unit 2, and the mass spectrometer unit 2 is operated to repeatedly perform a scan measurement over a predetermined mass-to-charge-ratio range. The scan measurement is continued for the same period of time as the measurement execution period for a target sample, which will be mentioned later. The MS spectrum data collector 40 stores MS spectrum data obtained by each scan measurement. Subsequently, under the control of the analysis control unit 5, the injector 12 injects the target sample into the mobile phase. The various components contained in the target sample are separated from each other by the column 13 and introduced into the mass spectrometer unit 2. In advance of the measurement for the target sample, the analysis operator appropriately sets an event so that an MS/MS measurement for a target component in the target sample will be performed. The analysis control unit 5 controls relevant sections according to the control sequence created based on that event.

By an LC/MS measurement for the target sample, a product-ion scan measurement in which an ion having a specific mass-to-charge ratio originating from the target component is selected as the precursor ion is repeated around the point in time at which the target compound is eluted. The MS/MS spectrum data collector 41 stores MS/MS spectrum data obtained by the product-ion scan measurement. Consider the case where a target component appears around retention time t2 as shown in FIG. 7B. When it is necessary to correct the mass at each peak on an MS/MS spectrum on which the product-ion peaks originating from the target component obtained around retention time t2 are observed, the mass correction information calculator 42 retrieves the MS spectrum obtained at the same point in the elapsed time from the beginning of the measurement as the MS/MS spectrum concerned (see FIG. 7A). An ion peak originating from a standard component is present on the retrieved MS spectrum. The mass correction information calculator 42 locates this ion peak and calculates mass correction information from the measured and theoretical values of the mass-to-charge ratio of the peak. Using the calculated mass correction information, the mass corrector 43 corrects the mass-to-charge ratio of each ion peak on the MS/MS spectrum concerned.

In this case, the MS spectrum from which the mass correction information used for the mass correction of the ion peaks on the MS/MS spectrum has been calculated is not an MS spectrum obtained at the same point in time as the MS/MS spectrum. However, the MS spectrum from which the mass correction information is calculated and the MS/MS spectrum on which the mass correction information is used for the mass correction of the ion peaks are obtained at the same point in the elapsed time from the beginning of the measurement in the two measurements, one for the standard sample and the other for the target sample. In normal situations, the peaks on a series of mass spectra obtained with the mass spectrometer unit 2 are gradually displaced with the passage of time from the beginning of the measurement. Therefore, it is possible to consider that the amount of displacement of the peaks in the mass-to-charge-ratio direction is approximately the same in both the MS spectrum and the MS/MS spectrum obtained at the same elapsed time in the two measurements. Accordingly, the mass-to-charge ratios can be obtained with high accuracy, although the mass correction in the LC-MS in the second embodiment is neither an internal standard method nor a method based on it.

Although the tandem mass spectrometer in the previous embodiment is a Q-TOF mass spectrometer, the present invention is also applicable in a triple quadrupole mass spectrometer.

Any of the previous embodiments and variations is a mere example of the present invention, and any change, addition or modification appropriately made within the spirit of the present invention in any aspect other than those already described will evidently fall within the scope of claims of the present application.

For example, in the LC-MS in the first embodiment shown in FIG. 1, the standard sample is mixed in the eluate through the mixer 14. It is also possible to provide two ESI sprays 26, with one spray supplied with the eluate from the column 13 and the other spray supplied with a standard sample, so that the ions generated by spraying the eluate and the standard sample will be collectively transported into the first intermediate vacuum chamber 22 and the subsequent sections. According to this configuration, the ions originating from the components in the eluate and those originating from the standard sample can be simultaneously analyzed by simultaneously spraying the sample liquids from the two ESI sprays 26 to ionize them. Furthermore, the two ESI sprays 26 can be operated to selectively spray one of the sample liquids to selectively perform an analysis of the ions originating from the components in the eluate or an analysis of the ions originating from the standard sample, as in the LC-MS in the second embodiment.

REFERENCE SIGNS LIST

1 . . . LC Unit
10 . . . Mobile Phase Container

11 . . . Liquid-Sending Pump
12 . . . Injector
13 . . . Column
14 . . . Mixer
2 . . . Mass Spectrometer Unit
20 . . . Chamber
21 . . . Ionization Chamber
22 . . . First Intermediate Vacuum Chamber
23 . . . Second Intermediate Vacuum Chamber
24 . . . First Analysis Chamber
25 . . . Second Analysis Chamber
26 . . . ESI Spray
27 . . . Desolvation Tube
28 . . . Ion Guide
29 . . . Skimmer
31 . . . Quadrupole Mass Filter
32 . . . Collision Cell
33 . . . Multipole Ion Guide
34 . . . Ion Passage Hole
35 . . . Ion Guide
36 . . . Orthogonal Accelerator
37 . . . Flight Space
38 . . . Reflector
39 . . . Ion Detector
4 . . . Data-Processing Unit
40 . . . MS Spectrum Data Collector
41 . . . MS/MS Spectrum Data Collector
42 . . . Mass Correction Information Calculator
43 . . . Mass Corrector
44 . . . Mass Spectrum Creator
5 . . . Analysis Control Unit
51 . . . Control Sequence Creator
52 . . . Control Sequence Storage Section
6 . . . Central Control Unit
7 . . . Input Unit
8 . . . Display Unit

The invention claimed is:

1. A tandem mass spectrometer including: a first mass separator configured to select, as a precursor ion, an ion having a specific mass-to-charge ratio from ions originating from a sample; a collision cell configured to dissociate the precursor ion; and a second mass separator configured to perform a mass spectrometric analysis of various product ions generated by the dissociation, the tandem mass spectrometer further comprising:

a) an analysis controller configured to control relevant sections so as to repeat, within a predetermined time range, a cycle in which a scan measurement that carries out a mass scan over a predetermined mass-to-charge-ratio range in the first mass separator or the second mass separator without dissociating the precursor ion within the collision cell and obtains data forming an MS spectrum, and a product-ion scan measurement that carries out a mass scan over a predetermined mass-to-charge-ratio range in the second mass separator while dissociating the precursor ion within the collision cell and obtains data forming an MS/MS spectrum, are each individually performed at least one time; and b) a correction processor configured to correct a first mass-to-charge ratio of a product ion originating from a component in a target sample in the MS/MS spectrum obtained by carrying out the product-ion scan measurement for the component under the control of the analysis controller, using a second mass-to-charge ratio of an ion originating from a standard component whose mass is precisely known in the MS spectrum obtained by carrying out the scan measurement within the same cycle as the product-ion scan measurement concerned or by carrying out the last scan measurement before the cycle concerned.

2. The tandem mass spectrometer according to claim 1, wherein:

the correction processor is configured to correct the first mass-to-charge ratio, using the second mass-to-charge ratio obtained in a predetermined scan measurement.

3. The tandem mass spectrometer according to claim 1, wherein:

the correction processor is configured to correct the first mass-to-charge ratio, using the second mass-to-charge ratio obtained in the scan measurement carried out within the same cycle as the product-ion scan measurement concerned or the last scan measurement carried out before the product-ion scan measurement concerned among a series of scan measurements repeatedly carried out over the predetermined mass-to-charge-ratio range throughout a measurement time from a beginning to an end of an entire measurement.

4. A tandem mass spectrometer including: a first mass separator configured to select, as a precursor ion, an ion having a specific mass-to-charge ratio from ions originating from a target sample; a collision cell configured to dissociate the precursor ion; and a second mass separator configured to perform a mass spectrometry analysis of various product ions generated by the dissociation, the tandem mass spectrometer further comprising:

a) a first analysis controller configured to control relevant sections to perform a scan measurement that carries out a mass scan over a predetermined mass-to-charge-ratio range in the first mass separator or the second mass separator without dissociating an ion within the collision cell and obtains a first mass-to-charge ratio of an ion originating from a standard component whose mass is precisely known at a predetermined elution time from a beginning of the scan measurement;

b) a second analysis controller configured to control relevant sections to perform a product-ion scan measurement that carries out a mass scan over a predetermined mass-to-charge-ratio range in the second mass separator while dissociating an ion within the collision cell and obtains a second mass-to-charge ratio of a product ion originating from a component in the target sample at the predetermined elution time from a beginning of the product-ion scan measurement; and c) a correction processor configured to correct the second mass-to-charge ratio using the first mass-to-charge ratio, wherein the scan measurement and the product-ion scan measurement are separately performed within different periods of time.

* * * * *